United States Patent [19]
Bauer et al.

[11] 3,965,418
[45] June 22, 1976

[54] TELEPHONE SYSTEM TESTING APPARATUS AND TECHNIQUES UTILIZING CENTRAL MEASURING EQUIPMENT WITH A PLURALITY OF REMOTE TEST STATIONS

[75] Inventors: Paul R. Bauer, Palo Alto; Duane E. Dunwoodie, Los Altos, both of Calif.

[73] Assignee: Wiltron Company, Palo Alto, Calif.

[22] Filed: Mar. 6, 1975

[21] Appl. No.: 555,727

Related U.S. Application Data

[62] Division of Ser. No. 411,818, Nov. 1, 1973, Pat. No. 3,890,495.

[52] U.S. Cl. .............................. 324/99 D; 324/115; 324/123 R
[51] Int. Cl.² .................. G01R 17/04; G01R 15/08
[58] Field of Search ................. 324/99 D, 123, 115, 324/77 A, 119

[56] References Cited
UNITED STATES PATENTS

| | | | |
|---|---|---|---|
| 3,652,934 | 3/1972 | Paljug et al. ..................... | 324/123 R |
| 3,790,886 | 2/1974 | Kurtin et al ....................... | 324/99 D |

*Primary Examiner*—R. V. Rolinec
*Assistant Examiner*—Ernest F. Karlsen
*Attorney, Agent, or Firm*—Limbach, Limbach & Sutton

[57] ABSTRACT

Centralized telephone circuit testing equipment with receptacles for selectively receiving a wide variety of electronic circuit modules, various modules being provided to make the equipment capable of performing a large number of commonly employed telephone tests. A scanning system is disclosed as part of the central measuring equipment for determining which of a plurality of remote testing stations has requested access to the central measuring equipment, one requesting remote station at a time being given complete control over a test function of the central measuring equipment for conducting tests on a telephone trunk. Improvements are also disclosed in the individual test function electronic circuit modules, including common circuits for use in measuring both signal level and circuit noise, a logarithmic analog-to-digital convertor capable of handling signals that cross zero dBm in level, round off digital display circuits to improve accuracy of the display and to aid in calibrating the instruments, and an improved frequency measuring circuit.

8 Claims, 9 Drawing Figures

MODULE IDENTIFICATION

| TEST FUNCTION | RECEPTACLE | | | | |
|---|---|---|---|---|---|
| | S1 | S2 | S3 | S4 | S5 |
| LEVEL / NOISE | L1 | L2 | L3 | | |
| FREQUENCY | | | | F1 | |
| OSCILLATOR | | | | | O1 |
| RETURN-LOSS | R1 | R2 | R3 | | |
| MULTIMETER CABLE ANALYZER | | | | M1 | M2 |
| DATA TRANSMISSION QUALITY | | | | P1 | P2 |

FIG. 4.

RECEPTACLES CONNECTIONS

| CIRCUIT FUNCTION | RECEPTACLE | | | | |
|---|---|---|---|---|---|
| | S1 | S2 | S3 | S4 | S5 |
| CONTROL CIRCUITS | X | X | X | X | X |
| SIGNAL INPUT & OUTPUT CIRCUITS | X | | X | X | X |
| VISUAL READOUT CIRCUITS | | X | | X | |

TELEPHONE SYSTEM TESTING APPARATUS AND TECHNIQUES UTILIZING CENTRAL MEASURING EQUIPMENT WITH A PLURALITY OF REMOTE TEST STATIONS

This is a division of application Ser. No. 411,818, filed Nov. 1, 1973, now U.S. Pat. No. 3,980,495.

BACKGROUND OF THE INVENTION

This invention relates generally to apparatus and techniques for measuring various parameters of a communication circuit, and more specifically relates to such apparatus and techniques for conducting common telephone circuit testing of the type presently employed in telephone central offices and elsewhere.

In telephone central offices, there are a large number of telephone trunks which must be periodically checked for satisfactory operability. Such measurements are required to be often made especially in view of the automatic nature of present day telephone central offices. Furthermore, the quality of telephone circuits must be high in order to handle data communication which is increasingly being transmitted along ordinary telephone trunks. Despite this increased requirement for monitoring telephone trunks, the availability of skilled craftsmen to operate complicated testing equipment is decreasing.

Accordingly, it is desirable that a single central office telephone trunk testing system be capable of making all the standard measurement but yet be operable by telephone technicians of moderate technical skills. Such a testing system must be capable of sending test signals as well as receiving them from telephone trunks under test. For a central office, it is desirable that such a testing system be capable of serving several technicians and/or various locations within a central office facility. In order to keep the cost of such apparatus down, there should be no excess capability but rather only the test functions desired in a particular installation should be provided. Additionally, such a test system should be as automatic in operation as possible and further should provide a numerical output display of the parameters being measured. Such a numerical (commonly called digital) display reduces the possibility of an erroneous reading. The circuits of such a testing system should be fast responding in order to reduce the time necessary for a measurement and they should be simple to calibrate so that a technician will be able to easily maintain the testing circuits in an accurate state. It is, therefore, a primary object of the present invention to provide a single communication circuit testing system with all these features.

It is also a primary object of the present invention to provide a testing system that maximizes the capability for performing a wide variety of standard telephone trunk measurements per dollar cost of the testing system.

It is a more specific object of the present invention to provide common electronic circuits that are switchable to perform more than one testing function.

It is a further object of the present invention to provide visual readouts of a telephone trunk parameter being measured with increased accuracy.

It is a further specific object of the present invention to provide a frequency measuring electronic circuit with increased response speed and accuracy.

SUMMARY OF THE INVENTION

Briefly, these and additional objects are accomplished by the techniques of the present invention where, according to one aspect thereof, various testing functions, such as signal level, frequency measurement, oscillator etc., are each provided in a separate module or group of modules that are mechanically and electrically insertable into central measurement equipment. Therefore, circuits capable of performing functions that are not desired for a particular installation need not be provided, thereby maximizing the measurement capability desired per unit cost of the testing system. The central measuring equipment is provided with a plurality of receptacles for receiving the plurality of modules which are all the same size. The module size chosen is that which will contain all of the circuits necessary for performing that testing function which requires the minimum amount of space for its circuits. In the example described hereinafter, that module size determining function is the oscillator which takes up less space than any of the other test functions. Circuits required for some test functions require more than one module and interconnections are provided between receptacles of the central measuring equipment so that the several modules containing complete circuits for one test function operate together in performing that function. The interconnections between receptacles programs the central measuring equipment to support the test function established by the particular modules selected and inserted into the receptacles. Other programming, such as switching or patching, is not required to select the test function.

In one form, the central measuring equipment contains two or more sets of identically wired receptacles (two or more equipment sections) into which the test circuit modules may be inserted. There are at least two modules provided that are uniquely mechanically and electronically acceptable to each of the receptacles in each of the equipment sections. That is, there are two modules which may be inserted into a first receptacle of one equipment section or a first receptacle of the other equipment section but not in any of the other receptacles. Two additional modules are provided for each of the other receptacles of the two equipment sections. As a result, either the same modules may be positioned in the receptacles of each of the equipment test sections in order to provide twice the capacity for performing a limited number of testing functions or each of the equipment sections may contain different modules in order to maximize the number of testing functions that the equipment may perform. Of those two or more modules required to perform a particular testing function, the circuits are grouped into each of the modules such that a signal receiver circuit is in one module, a signal transmitter in another, and display driving circuits in another, etc. When two such multi-module specific test circuits have similar functional components, its similar components, such as a signal receiver, are packaged in a module to be received by a single central equipment receptacle, thereby reducing the complexity of the receptacle wiring and enabling the use of basically the same circuits for the functionally equivalent module of two different testing circuits. That is, for instance, if a signal receiving module exists as part of two different testing circuits contained in more than one module, the receiving circuit module of each of the circuits may basically be the same electronic circuit but differing only in its particular requirements for the differing specific testing functions. The result is the saving of the cost of circuit modules by such a breakdown in grouping of its circuit components.

According to another aspect of the present invention, a plurality of remote testing stations are provided which may be physically separated from one another throughout a central office and interconnected to the central measuring equipment containing the testing modules. One remote testing panel at a time is given complete control and access to all of the testing circuits contained in one complete equipment section thereof. Each equipment section has independent electronic scanning means for interrogating each of the remote testing control panels to determine which remote location is requesting access to the central testing equipment. A requesting location is then given complete control over that equipment section to perform the tests of which it is capable by remote control from the testing location. All other remote testing location control panels are given a busy indication which tells a technician that he will have to wait until the technician that is now using the equipment releases it upon the completion of his test. Upon such release, the scanning means determines if some other testing location is requesting access and then connects that testing location for the exclusive use of that particular equipment section of the central measuring equipment. The second equipment section of the central measuring equipment may serve the same testing locations with different testing functions or may serve a different set of testing locations than does the first equipment section with either the same of different testing functions.

As a further reduction in circuit components, a single circuit is provided in a set of modules, according to another aspect of the present invention, for measuring either signal level or telephone line noise in accordance with the state of a binary control signal. It is recognized that signal level and noise measurements utilize a great deal of common circuit components so these functions have been combined. The result is a significantly reduced circuit size for providing both functions in comparison with furnishing separate sets of modules for each of the two functions. Further reductions in equipment result since common display and control devices may be used for both functions. This all results in significant equipment cost and space savings.

According to another aspect of the present invention logarithmic analog-to-digital conversion circuits are provided in driving a numerical display device which has the capability of crossing zero dBm without any analog voltage switching. This ability to cross zero is necessary in order to perform measurements over existing signal level ranges, normally +10 dBm thru −52 dBm. Zero crossing is noted and compensated for, according to the present invention, by digital timing circuits, thus reducing the possibility of error which exists in present zero crossing logarithmic analog-to-digital convertors wherein the analog logarithmic voltage generating circuits are switched in response to the zero crossing.

According to another specific aspect of the present invention, data for one more digit than is actually displayed is electronically developed and this least significant electronically generated signal is used for rounding off the least significant displayed digit when the undisplayed signal has a value of from 5 through 9. The display values then have increased accuracy. This undisplayed digital signal is also coupled to a calibrating panel light to indicate when the undisplayed digit is at a certain preset value, thus aiding in precise calibration of the instrument.

According to yet another aspect of the present invention, a frequency measurement system is provided in the nature of a phase lock loop which is capable of faster measurement of signal frequency than possible with persent instruments. A conventional frequency measurement technique requires a minimum time of one second to perform a measurement to 1 Hz. accuracy. When using this technique, a technician experiences difficulty in setting the frequency of an oscillator he is monitoring because the visual feedback he received from prior frequency measurement displays is too slow. He must wait each time he makes a small correction in oscillator frequency before he sees the results. It is then easy for him to over-correct or under-correct, further prolonging the time it takes to set the frequency of the oscillator. The present invention overcomes this problem by reducing the time required to make a frequency measurement by at least a factor of 10, resulting in the technician having the feeling of rapid almost continuous visual feedback, permitting him to quickly set an oscillator frequency to 1 Hz. accuracy. This then significantly speeds up those testing operations which require repetitive frequency setting and measurement (for example, frequency response measurements).

A testing system incorporating the various aspects of the present invention as described and claimed herein is presently being marketed by the Assignee of the present application, the Wiltron Company of Palo Alto, Calif. Various descriptive literature is available from the Assignee of the present application describing certain additional details of the various aspects of the inventions herein, including brochures entitled "WILTRON DTMS" and "WILTRON ITMS."

Additional objects, advantages and features of the present invention are described in the following detailed description of a preferred embodiment thereof which should be taken in conjunction with the accompanying drawings.

DESCRIPTION OF THE PREFERRED EMBODIMENTS

Figure 1:
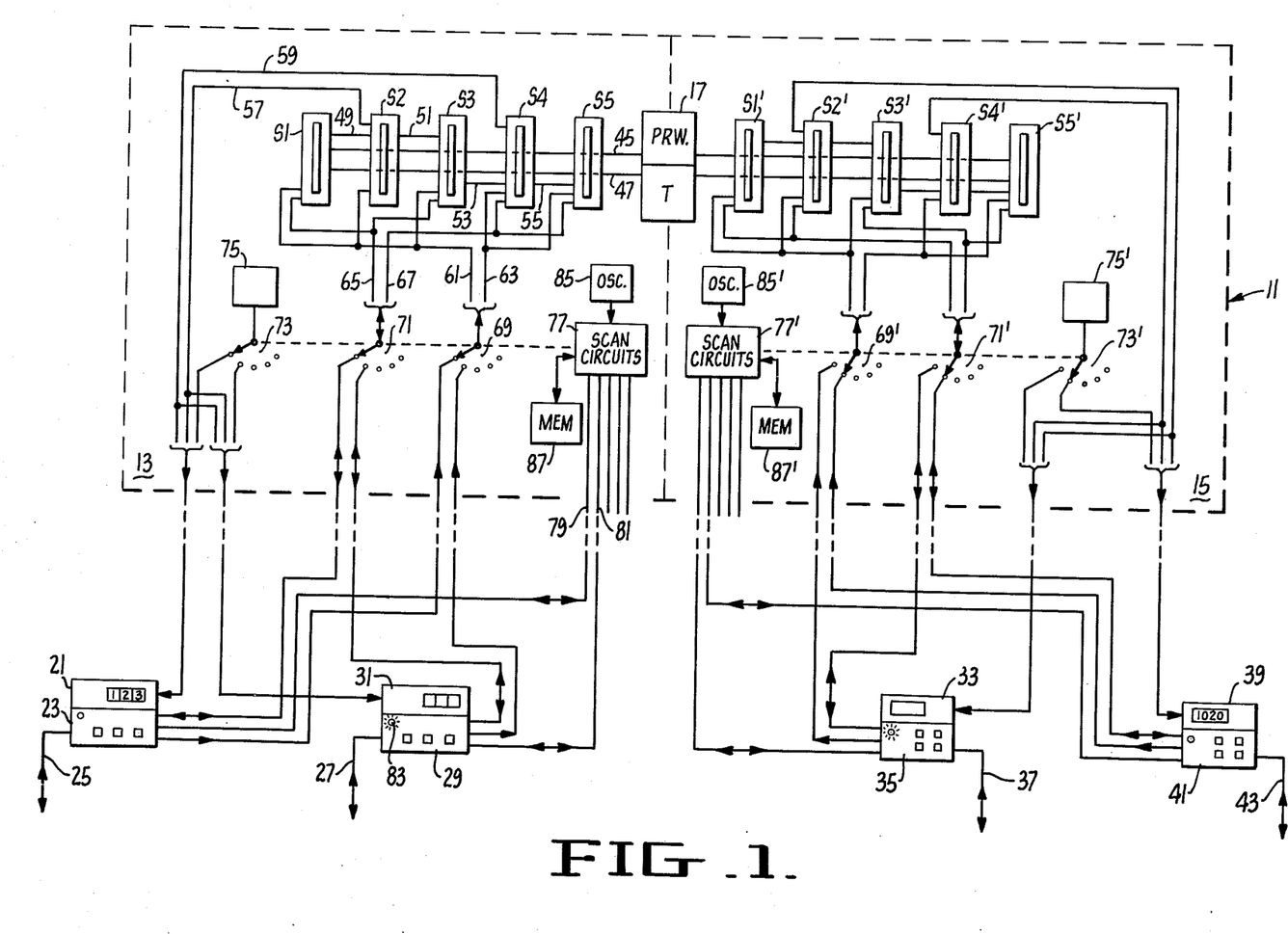
FIG. 1 schematically illustrates the basic components of a telephone testing system according to one embodiment of the various aspects of the present invention.

Referring to the system diagram of FIG. 1, central measuring equipment 11 includes two substantially identical equipment sections 13 and 15 in a single enclosure which share a common power supply 17 and a common electronic timing circuit 19. Except for such common circuits, the central equipment sections 13 and 15 are substantially independent from one another. The central measuring equipment 11 is positioned at one position within a telephone central office and is remotely connected to a plurality of testing stations.

For example, one testing station connected to the equipment section 13 includes a display panel 21 and a control panel 23. A telephone trunk to be tested is connected to a line 25 for both sending signals into the telephone trunk and receiving signals from the trunk. At a different location in the central office, some other group of telephone trunks may be tested through a connection 27 to a second control panel 29 that is substantially identical to the first control panel 23. Additionally, a display panel 31 is provided at the second location. Although only two remote control and display panels are shown, it will be understood that there may be provided a large number of additional positions within the central office that are connected to the equipment section 13. The equipment available from the Assignee of the present application has a capacity of 10 remote testing locations for each of the equipment sections 13 and 15.

The equipment section 15 similarly is connected to a plurality of remote and display panels at various positions through a telephone central office. For instance, at one location a display panel 33 and a control panel 35 are connected to the equipment section 15 for testing telephone trunks through a connection 37. Similarly, the same kind of display 39 and the same kind of control panel 41 are provided for connection to telephone trunks through a circuit 43. As will become apparent from the description that follows, the two equipment sections 13 and 15 may be provided with the capacity for its remote locations to provide exactly the same testing functions. In such a case, the remote control and display panels of the second equipment section 15 are positioned at different locations throughout the central office than those of equipment section 13. In the example of 10 stations per equipment section, there is a capacity, therefore, of 20 different locations through the central office sharing the same common measuring equipment 11. Since one-half of these remote stations operate independently of the other one-half, the remote stations associated with one equipment section 15 may even have different testing functions than those associated with the equipment section 13. That is, the testing functions provided by the equipment section 13 may measure one set of parameters of a telephone circuit while the testing functions provided in the second equipment section 15 may measure a wholly different set of parameters. When more than 20 locations need to be served, additional common measuring equipment are used providing unlimited capacity in steps of 10 stations. In this case, one remote station associated with each of the equipment sections 13 and 15 are provided adjacent to one another at a common remote testing location within the central office. This provides two sets of control panels and display devices at selected remote locations and provides an added capability of testing functions that may be performed from that one location. In this example, only 10 remote locations could be served by the central measuring equipment 11 wherein each station receives all testing functions. As another example, 10 locations could be served by the first equipment section 13 with six of these locations also being served by the second equipment section 15 and four other locations served by the equipment section 15.

The equipment section 13 includes five receptacles for receiving test circuit modules, these receptacles (sockets) being schematically illustrated as S1, S2, S3, S4 and S5. An identical set of receptacles S1', S2'', S3'', S4'' and S5'' are provided as part of the equipment section 15. Since the receptacles or sockets of the equipment section 15 are identically wired to those of the equipment section 13, only one set will be described in detail. Each of the sockets S1 through S5 of the equipment section 13 is connected to a common power bus 45 for obtaining power from the common power supply circuit 17. Similarly, a timing signal bus 47 is connected to each of the sockets from the common timing signal generating circuits 19. Other contacts of the sockets S1 and S2 are interconnected by circuits 49, sockets S2 and S3 interconnected by circuits 51, S3 and S4 interconnected by circuits 53 and sockets S4 and S5 interconnected by circuits 55. Display circuits 57 are connected to pins of the socket S2 while display circuits 59 are connected to pins of the socket S4. The circuits 57 and 59 are provided for carrying readout indications from modules plugged into the sockets S2 and S4 to digital readout display panels at the various remote testing locations.

In order to control the operation of the module circuits that are plugged into the sockets S1 through S5, other pins of sockets S1, S2 and S3 are connected to a common control circuit 61 while pins of the sockets S4 and S5 are connected to a control circuit 63. Modules adapted for plugging into certain of the sockets also need provisions for obtaining signals from a telephone line under test and for sending signals into a telephone line under test. Accordingly, certain of remaining pins of the sockets S1 and S3 are commonly connected to a signal circuit 65 while pins of the sockets S4 and S5 are connected to a common signal circuit 67. It will be noted that no signal leads are connected to socket S3 and further that no readout circuits are connected to the sockets S1, S3 or S5.

The control circuit 61 and 63 are switchable by some convenient apparatus indicated in FIG. 1 as a rotary switch 69 between the various remote locations so that only one remote location has control of the testing circuit of equipment section 13 at any one time. In the position shown in FIG. 1, the rotary switch 69 has the control circuits 61 and 63 connected to the control panel 23 exclusively while the remaining remote control panels associated with the equipment section 13 have no operational control thereover. Similarly, a second switching device such as a rotary switch 71 connects the signal circuits 65 and 67 to the same control panel 23. Also, an appropriate switching device such as a rotary switch 73 connects an unblanking signal source 75 only to the display panel 21 which is located at the same remote testing location as the enabled control panel 23. Each of the control panels associated with the equipment section 13 are connected to the display circuits 57 and 59 but only one at a time receives an unblanking signal from the circuit 75 which permits display of the quantity being read. Each of the switching circuits 69, 71 and 73 are preferably semiconductor circuits but are shown as rotary switches in FIG. 1 for ease of explanation. Each of the switches 69, 71 and 73 are ganged to be connected to the same remote location equipment and are all controlled by common scanning circuitry 77.

In one form of the scanning circuitry 77, each of the remote control panels is scanned in sequence through independent lines to each, such as circuits 79 connected to the control panel 23 and circuits 81 connected to the control panel 29, to see if a technician at the location is requesting access to the testing circuits of the equipment section 13. To request access, a technician initiates at the remote control panel a signal which is carried back through the control lines to the scanning circuits 77. Scanning circuit 77 operates to detect such a request for access when the equipment 13 is not being utilized by scanning the remote locations one at a time in a predetermined sequence. The scanning circuit 77, upon detecting such a request, ceases scanning and subsequently switches the rotary switches 69, 71 and 73 (which remain inoperative during such scanning) to connect their respective circuits to the requesting remote location. At the same time, the scanning circuit 77 sends out through the other lines, such as the line 81, a busy signal which is preferably indicated at each of the other remote locations by a busy light 83 or some other convenient indication. That one remote location, indicated to be the remote location including the control panel 23 of FIG. 1, then has complete control of the testing equipment within the equipment section 13 to the exclusion of all other remote locations connected to that same equipment section. When the technician at that remote location is through making his test, he initiates a signal through the control line 79 to the scanning circuit 77 indicating he has completed his tests. At this time, the scanning circuit 77 looks at the other remote locations in order through the lines communicating them to the scanning circuit 77 to identify any further requests for access. When one is discovered, scanning is again stopped and the rotary switches 69, 71 and 73 are connected to this new access requesting remote location.

Such a scanning circuit 77 may include a digital counter that is stepped by a signal from an oscillator 85 through its various scan positions in sequence to determine which remote location is requesting access to the equipment section 13. When an access request signal is sensed in one of the lines 77 to which the counter is connected, the counter is then stopped while the switching circuits 69, 71 and 73 provide connection of the requesting remote location to the equipment. Rather than scanning each of the remote locations in a predetermined sequence, a memory 87 may optionally be employed to remember the time sequence in which various remote locations have requested access to the equipment so that when one remote location is through using the equipment, the scan circuit 77 directs the rotary switches 69, 71 and 73 to connect to the waiting remote location that first made its request for access.

The second equipment section 15 has independent scanning and connection circuits, the components thereof which are similar or identical in function to those described with respect to the equipment section 13 being indicated by the same reference numerals with a prime ('). The remote testing control and display panels that are connected to the second equipment section 15 are independently accessed therefrom in the same manner as described with respect to the equipment section 13.

Figure 2:
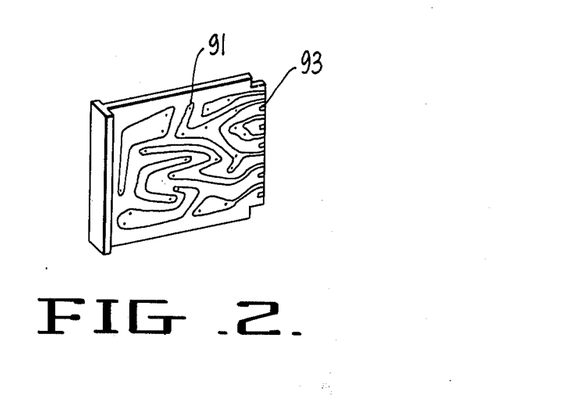
FIG. 2 illustrates a typical module which is plugged into the system of FIG. 1.
Figure 3:
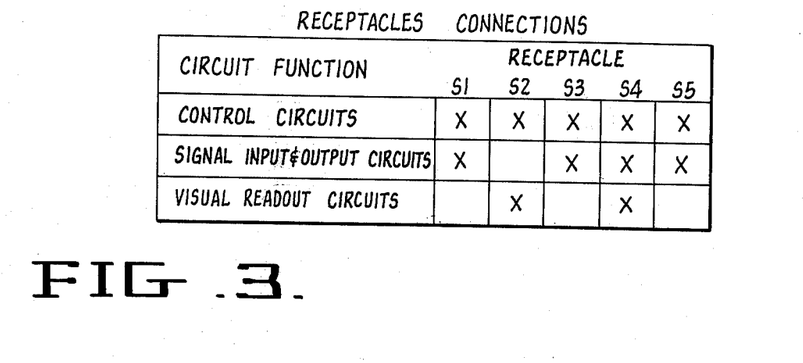
FIG. 3 is a table summarizing the connection of receptacles of the system shown in FIG. 1.

Referring to FIG. 2, the physical configuration of a typical testing circuit module that is plugged into one of the receptacles S1 through S5 of FIG. 1 is shown. The main component of each module is a single printed circuit board 91 that contains the various active and passive electronic components with the wiring between the components being "printed" on the face of the single flat rigid printed circuit board substrate. One edge 93 of each module contains a large number of electrical contacts which are cooperatively placed for engaging electrical contacts of one of the receptacles S1 through S5 when inserted therein. These modules contain the circuits for performing the desired tests on the telephone line since the central equipment 11 of FIG. 1 without such modules is capable of performing no tests. The modules are selected and inserted into the various receptacles of the central equipment 11 in order to provide the testing functions desired for a particular installation without having to provide circuits for testing functions which will not be used in that specific testing installation.

Figure 4:
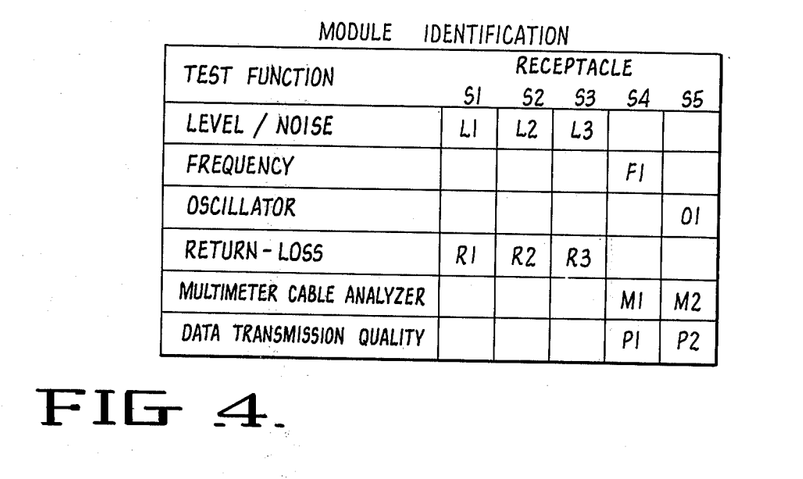
FIG. 4 is a table which identifies the modules by testing function and their placement within the receptacles of the system of FIG. 1.

With reference to the table of FIG. 4, the testing functions which may be provided in the form of plug-in modules are listed. One such function is to measure the signal level of a telephone circuit and this is accomplished by inserting two modules L2 and L3 into the receptacles S2 and S3, respectively, of the central equipment. Each of the modules is mechanically designed so that it will be accepted by only one of the receptacles S1 through S5 and it will be noted that there are at least two modules which may be plugged into each of the central equipment receptacles. The signal level modules L2 and L3 also provide a portion of the circuits required to make circuit noise and frequency measurements. When the module L1 is added in combination therewith by plugging into the receptacle S1, the three modules will measure both signal level and circuit noise level in response to selection of a control signal. The level/noise circuitry is illustrated generally in FIG. 5, to be described hereinafter, showing what circuit elements are generally included in the various level/noise modules L1, L2 and L3.

The third testing function for which capability is provided is to measure the frequency of an incoming signal and a module F1 is provided for this purpose. The frequency measuring circuit of the module F1 is described hereinafter in detail with respect to FIGS. 8 and 9. The signal input for the module F1 is obtained from the signal level module L3. In this very specific example being described, the modules L3 and F1 must be used together in order to measure frequency. The frequency module F1 is uniquely adapted for insertion into the receptacle S4.

An oscillator is provided on a single module printed circuit board 01 which is adapted for insertion into the receptacle S5. The oscillator module 01 is completely self-contained and is the only module required to be used to make the central measuring equipment 11 have a signal generating capability. Of course, the frequency generated and other characteristics are remotely controlled from the control panel that is given access and control over the equipment section at that particular time. The oscillator circuitry is the less extensive of any of the test function circuits and thus has set the physical size of the module. That is, the oscillator module has been made just large enough to contain all of the oscillator circuits. For uniformity, all of the other modules are made the same size and since other test functions require considerably more circuitry, more than one module is required for these other test functions to be made available.

A fifth testing function is a return-loss measurement function wherein a signal is transmitted down a communication circuit and the level of the echo returned is measured. This is a standard measurement in a telephone circuit. Three modules R1, R2 and R3 contain all of the circuits for conducting this test and are adapted for insertion, respectively, into the receptacles S1, S2 and S3.

Another testing function provided by two modules M1 and M2 is a multi-meter cable analysis. These circuits provide a capability for measuring resistance, capacitance, and similar parameters of a communication circuit. These functions are conducted in a manner most suited to measurements on telephone lines.

A seventh function is to determine the data transmission quality of a telephone circuit. This test function is provided by circuits of two modules P1 and P2 which are insertable, respectively, in receptacles S4 and S5. These circuits test the properties of a communication circuit for transmitting data having its spectral energy concentrated in the voice band.

Other testing functions can similarly be accommodated in additional modules.

In order to provide the greatest flexibility in the testing system of the present invention, its components are preferably designed as "building blocks" where flexibility is provided to build-up from a single set of cmponents a custom multi-location testing system with only necessary or desired test functions being provided at each test location. In accordance with this desired flexibility, only one set of test function modules are utilized in each of the equipment sections 13 and 15 (FIG. 1). If more test capability is required at the remote testing locations, the central measuring equipment 11 is duplicated at a central location with its own display and control panels positioned at the remote testing locations. The scanning and switching circuit capability of each section of the equipment 11 could be designed to provide all the test functions of five modules that can be inserted into its five receptacles but it is easier to limit the scanning and switching capacity to that required for a single set of test function modules less than five and then to duplicate the equipment 11 at a central location to provide additional testing functions.

Even when the capacity of the scanning and switching circuits is so limited, the particular module designs of the present invention results in a multi-test function capability. For instance, the combined circuits providing signal level and noise level measurements makes both of these functions available through simple scanning and switching circuits. Also, since the frequency measuring circuits operate in combination with the level/noise circuits, as described in detail hereinafter, this testing function can additionally be provided, thus making all the level, noise and frequency measurements possible with a simple scanning and switching capability.

The system described with respect to FIGS. 1–4 may also be simplified to eliminate the multi-station scanning and switching circuits of the equipment 11 if only one set of remote control and display units needs to be provided for each of the equipment sections 13 and 15. Such remmote testing units then have full time access to their respective equipment sections. Since any limitation of the scanning and switching circuits as to available functions does not exist, all five receptacles of each equipment section may accommodate testing modules. If desired, 10 of the 12 available modules may be utilized in the central measuring equipment 11 of FIG. 1 in a manner providing the equipment section 13 with five of the modules and the equipment section 15 with five different modules. This utilizes the maximum testing capability of one central measuring equipment unit 11. For instance, the level/noise, frequency and oscillator functions may be provided by inserting the proper modules into the five receptacles of the equipment section 13. Return loss and multi-meter testing functions can then be provided by inserting the five modules required for these testing functions into the receptacles of the second equipment section 15. All of the remote control and display units can be located at the same location for maximum testing capability at that location or they may be located at different testing locations. In the latter case, it may be desirable to provide at least some of the same testing modules in each of the equipment sections 13 and 15. All of this illustrates the complete flexibility of the testing system according to the present invention.

Again referring to the table of FIG. 4, the particular functions allocated to each of the modules of a multi-module testing function can be described to show the similarity between the modules that are acceptable by the same receptacle of the central measuring equipment 11. Modules L3 and R3, either of which are insertable into the receptacle S3, contain receiver circuits. Because of the different tests being performed, the circuits cannot be exactly the same but there are enough similarities that certain economies in producing these two modules result. One module is merely the modification of the other module. Similarly, the modules L2 and R2 each contain logarithmic analog-to-digital convertors of a type described in detail with respect to FIG. 6 as well as digital display driving circuits. Each of the modules L2 and R2 is independently produced but the similarity in function makes one a mere modification of the other rather than having to build two completely different modules from scratch. The module L1 includes active filters used in the noise measurement and the module R1 contains circuits for a signal transmitter in conducting the return-loss measurement, completely different functions requiring completely different circuits. Therefore, thre are no economies between the modules L1 and R1 but the arrangement of the level/noise and return-loss circuit components in the various modules does result in two modules of each being very similar to each other.

Figure 5:
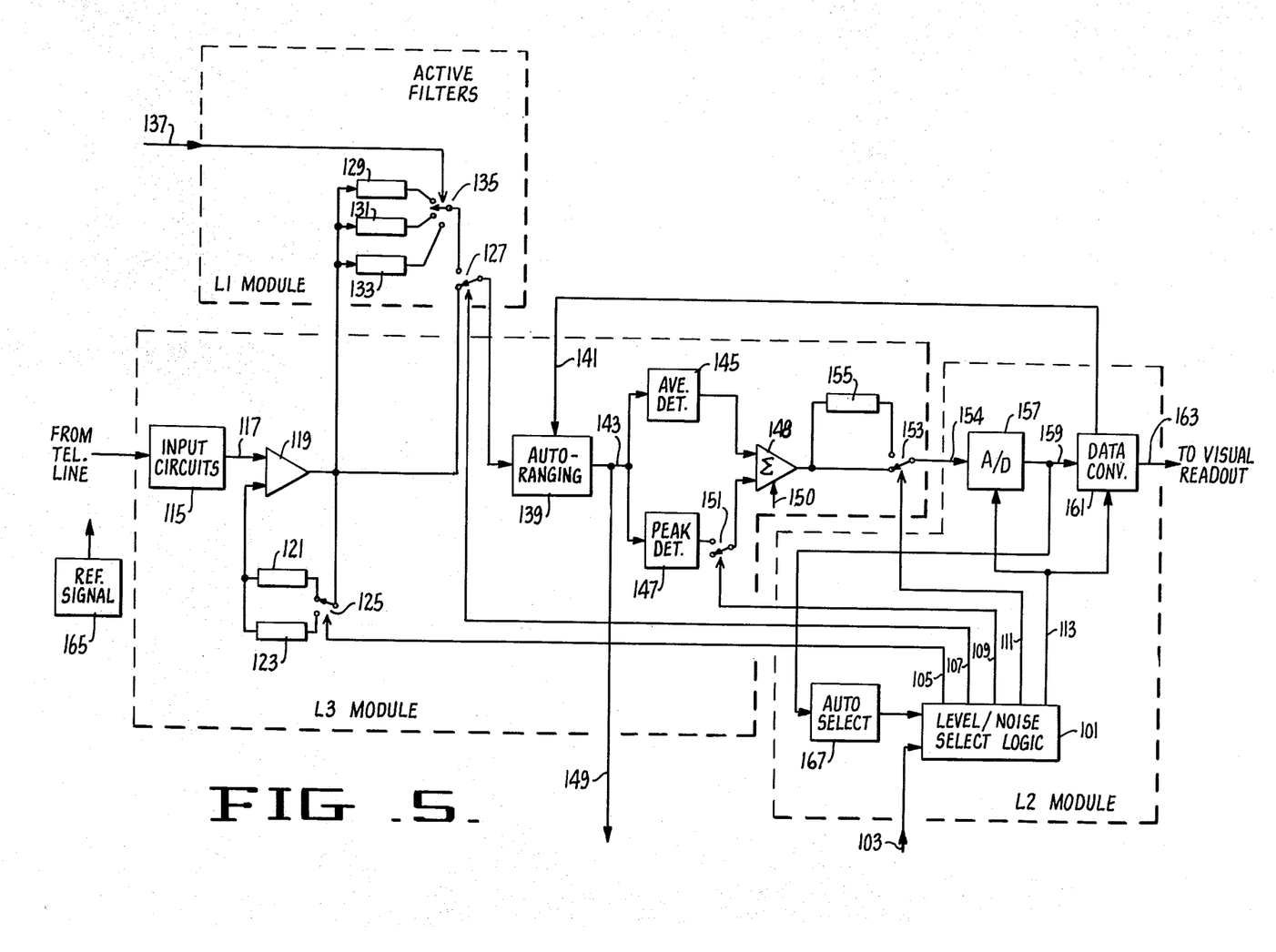
FIG. 5 illustrates generally a circuit provided in certain of the modules for measuring both the level of a signal and the noise in the communication circuit.

Referring to FIG. 5, a block diagram of the level/noise function testing circuits that are incorporated in the modules L1, L2 and L3 is illustrated. A central element in the circuit capability for performing either of these functions is a logic circuit 101 which is responsive to a binary signal in a line 103 to cause its output lines 105, 107, 109, 111 and 113 to control respective circuit elements to be described hereinafter for either signal level or noise measurement. That is, whether the binary signal is high or low in the line 103 determines whether the circuit of FIG. 5 will be configured to measure signal level or noise. The control signal in the line 103 is developed at a remote control terminal having access to the central equipment.

A telephone line under test is connected to input circuits 115 of FIG. 5 which has a primary purpose of converting a balanced input to a ground referenced signal in a line 117. This signal is then applied to an amplifier 119 having two impedance networks 121 and 123 in a feedback loop for setting the overall gain of the amplifier. One of the feedback loop impedances 121 or 123 is selected by a switch 125 in response to a control signal in the line 105 depending whether the circuit is set for signal level or noise level measurement. The impedance 121 is calculated to cause the amplifier 119 to have an overall amplification substantially less than it does when the impedance 123 is alternatively connected into the circuit. The difference in amplification can be about 40 dB in the specific example being described.

The output of the amplifier 119 is connected directly to one terminal of a switch 127, this terminal being selected by the control signal in the line 107 when the circuit is measuring signal level. The output of the amplifier 119 is also applied to three active filters 129, 131 and 133. An output of one of these three filters is selected by a switch 135 and is applied to a second terminal of the selector switch 127. This filter network is thus inserted in series with the output of the amplifier 119 when the circuit is measuring noise level. The particular filter 129, 131 or 133 that is selected is selected by a signal in a line 137 from a level/noise control panel at a remote location which has access to the central measuring equipment. Each of these filters passes generally a narrow bandwidth and each have different frequency characteristics that may be selected depending upon a particular noise measurement that is being made. For level measurements, no such filters are utilized.

The output of the selector switch 127 is applied to an auto-ranging circuit 139 which shifts the level of its input an amount determined by a ranging control signal in a line 141. The ranging circuits 139 include a combination of amplifiers and switchable impedances. The purpose of the auto-ranging circuits 139 is to shift whatever level of signal or noise that is coming into these circuits into a "window" at an output 143. That is, the signal or noise to be measured is shifted to a substantially constant level within a certain range or window so that subsequent circuits do not have to have a wide level range capability.

This output of the ranging circuits 139 in the line 143 is applied to an average detector 145 and to a peak detector 147 simultaneously. This output is also applied through a line 149 to a pin of the L3 module for connection to the F1 module when frequency measurement is to take place. That is, when the frequency measuring module F1 is utilized, the input circuits of the L3 module serve an automatic gain control function for the frequency measuring circuits.

The rectified and somewhat filtered output of the detector 145 is then applied as a DC signal level to a summation circuit 148 at one input thereof. The output of the summation circuit 148 is thus merely the average detected value of a signal level when the circuit is configured for such measurement. When the circuit is altered for noise measurement, however, the output of the peak detector 147 is connected through a closed switch 151 to a second input of the summation circuit 148. Thus, when measuring noise, the average detector 145 and the peak detector 147 operate in conjunction with the summation circuit 148 to form a quasi r.m.s. detector with characteristics normally found in noise measurement.

The output of the summation circuit 148 is applied directly to one terminal of a switch 153 and also through a filtering circuit 155 to a second terminal of the switch 153. The switch 153 is connected directly to the output of the summation circuit 148 when the circuit is measuring signal level while it is connected to pass the signal through the filter 155 when the circuit is configured to measure noise level. The added filtering is necessary only for the noise detected signal in order to provide more smoothing.

The signal from the switch 153 is applied to a logarithmic analog-to-digital convertor 157. The voltage level input to the circuits 157 is converted to a number of consecutive binary pulses of a total number linearly proportional to the logarithm of the input voltage level. This binary train of pulses is applied through a circuit 159 to a data conversion circuit 161 wherein this train of pulses is counted and this count applied to a visual readout at the remote location having access to the equipment through circuits indicated at 163. The operation of the analog-to-digital convertor 157 and the data convertor 161 is changed somewhat depending upon whether the signal in the line 113 indicates that a signal level or noise level measurement is to be taken. Briefly, these differences are that signal level is displayed to the nearest one tenth of a decibel while noise measurement to the nearest whole decibel, the update time for signal level measurements is several times faster than the update time for noise measurements, and the output display is made directly in dBm for signal level measurements while being shifted in scale for noise measurements to readout directly in dBrn. The blocks 157 and 161 are explained in more detail hereinafter with respect to FIGS. 6 and 7.

For calibration reference signal source 165 is connected to the input circuit 115 of FIG. 5. When the known reference signal is utilized, calibration is effected by setting the gain of the summation circuit 148 through an adjustment 150 until the visual readout indicates the level of the reference signal 165. A calibration indicator, described hereinafter, permits calibration of the circuits of FIG. 5 to an accuracy exceeding the resolution of the display.

It has previously been described that the circuit of FIG. 5 is controlled as to its function of measuring signal level or noise level by a manually initiated control in the signal in the line 103. It is also possible to automatically control the circuits of FIG. 5 by utilizing an automatic selection circuit 167 to switch the logic circuits 101 between their level measuring and noise measuring states. The automatic selection circuits 167 has an input from the digital output in the line 159 that is representative of the value of that signal. The circuits 167 detect the strength of the signal being measured. If it is below a threshold that has been set, for instance below −32 dBm, then the selection circuits 167 will switch the logic 101 into a noise measurement since in most cases a signal is not present when the total information in the telephone line is that low. Conversely, when the level in the telephone line is over −30 dBm then the circuits 167 can switch the circuit of FIG. 5 into its signal level measuring state. This automatic switching is not utilizable in all communications applications but is a feature of additional operation simplicity where it can be used.

Figure 6:
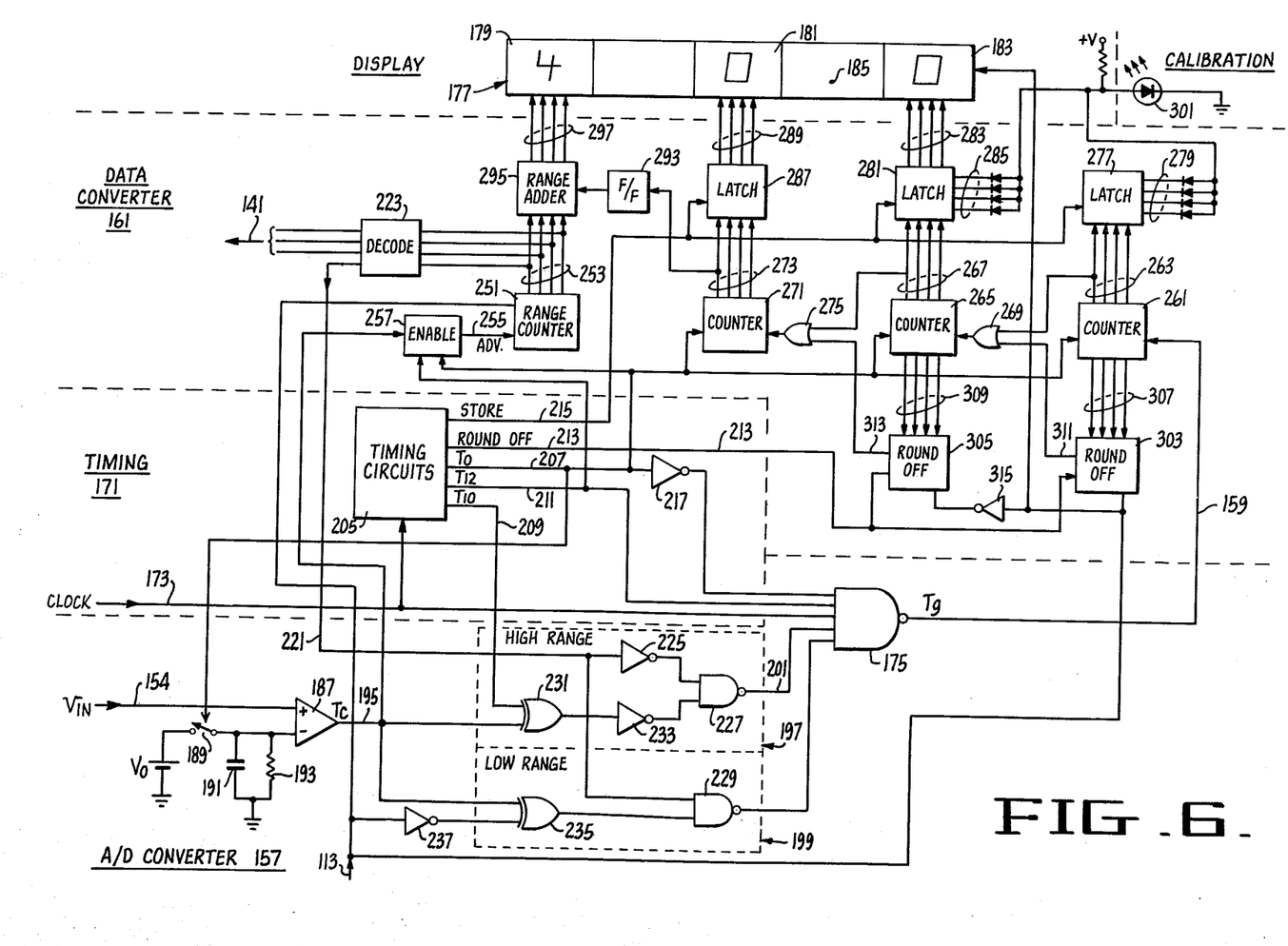
FIG. 6 shows a detailed schematic diagram of certain blocks of the circuit of FIG. 5.

The circuit blocks 157 and 161 of FIG. 5 are shown in greater detail in FIG. 6 as well as in conjunction with other circuit components which make them operate. Timing circuits 171 of FIG. 6 are shown separately but may just as well be part of either the circuit block 157 or 161. A clock signal is provided in a line 173 from the common timing circuits 19 of the central equipment module 11 (FIG. 1). The clock signal 173 of FIG. 6 is one of five inputs to an NAND gate 175. The other four inputs to the NAND gate 175 cooperate in a manner to be described hereinafter to permit the clock pulses 173 to pass through the gate in the line 159 to binary counters of the data convertor 161. It is the length of time that the NAND gate 175 is opened which determines the number of clock pulses which appear in a continuous pulse train in the line 159 and which ultimately determines the value displayed on a numerical (digital) display device 177. The display device 177 is, of course, remotely located from the rest of the circuitry of FIG. 6 since this circuitry is in the L3 module inserted into the central measuring equipment 11 (FIG. 1) while the display 177 is provided at a remote location. The single display 177 gives both signal level and noise level readings depending upon the state of the circuits of FIGS. 5 and 6. The reading is directly in decibels with a most significant digit 179, a middle digit 181 and a least significant digit 183 all being possible for display. A decimal point 185 appears when displaying signal level measurement.

Referring to the circuit details of FIG. 6, the DC voltage input $V_{IN}$ in a line 154 is applied to a non-inverting input of a comparator amplifying circuit 187. A fixed reference potential $V_0$ is applied through a switch 189 to a parallel circuit of a capacitor 191 and a resistor 193. This capacitor 191 and resistor 193 are also connected between ground and an inverting input of the comparator amplifier 187. An output line 195 from the comparator amplifier 187 is applied to inputs of both a "high range" gating circuit 197 and a "low range" gating circuit 199, each of these circuits (to be explained hereinafter) having outputs 201 and 203, respectively, which are two additional inputs to the NAND gate 175.

Figure 7:
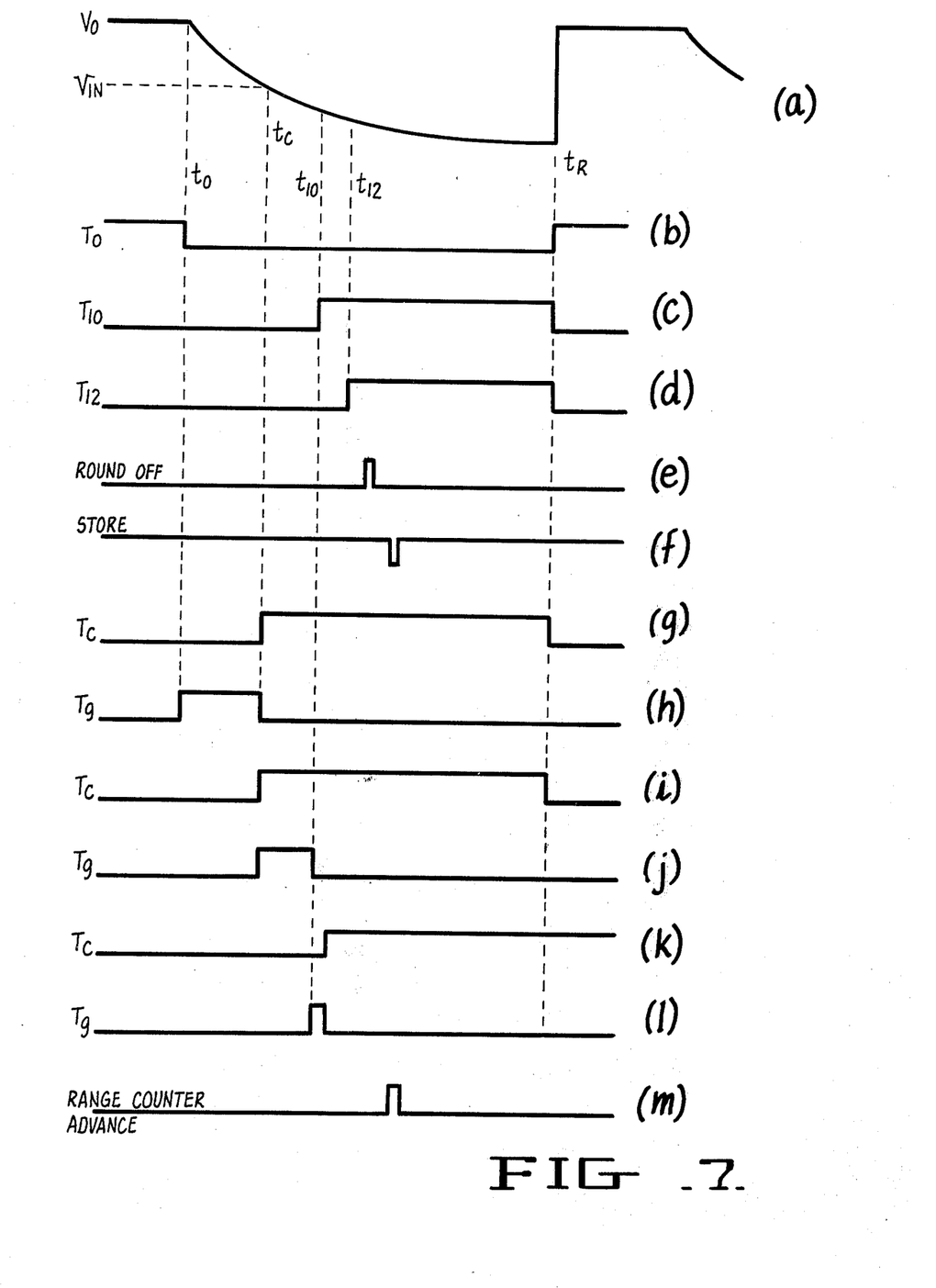
FIG. 7 is a timing diagram for the circuit of FIG. 6.

A timing circuit block 205 of FIG. 6 has several outputs which provide various sequential operations of the components of FIG. 6 that are required. The timing circuit 205 receives, of course, a clock signal from the line 173. A major component of the timing circuit block 205 is a binary counter which is continuously advanced by the clock signal in the line 173. A logic network within the block 205 of FIG. 6 is connected to the output of this binary counter for developing the necessary timing signals. The timing signals discussed herein with respect to FIG. 6 are $T_0$, $T_{10}$, $T_{12}$, "round off", and "store" timing signals which are shown in the timing diagram of FIGS. 7b, 7c, 7d, 7e and 7f, respectively. These timing signals appear at the output of the circuit block 205 of FIG. 6 in lines 207, 209, 211, 213 and 215, respectively. The timing signal $T_0$ in the line 207 is inverted in polarity by passing through an inverter 217, the output of the inverter 217 forming a fourth input into the NAND gate 175. The fifth and final input to the NAND gate 175 is provided by connection of that input to the line 211 to obtain the timing signal $T_{12}$.

The remaining structure and operation of the convertor 157 is best described with respect to an example shown along with the timing diagrams of FIG. 7. Consider a DC signal level $v_{IN}$ in the line 154 as shown in FIG. 7a. FIG. 7a shows the waveform of the voltage level applied to the inverting input of the comparator 187. At time $t_0$ the capacitor 191 which has been charged to the voltage $V_0$ begins to discharge through the resistance 193, and thus the voltage at the non-inverting input of the comparator 187 decreases according to a logarithmic function. At time $t_c$ the input voltages to the comparator 187 are equal and the output $T_c$ goes high as illustrated in FIG. 7g. This signal of FIG. 7g is applied to both the high range circuit 197 and the low range circuit 199, only one of which operates, depending upon certain factors described below.

The circuit being described has a capability of measuring signal level over a range from approximately +10 dBm to −50 dBm. Because of the logarithmic nature of the output, the digital counting of the logarithmic function illustrated in FIG. 7a is caused to differ depending upon whether the range measured and displayed is above 0 dBm or below 0 dBm. The logic circuits of the analog-to-digital convertor 157 receive this information through a line 221 from a decoding cirucit 223 whose function will be described hereinafter. A binary signal in the line 221 representative of whether a "high range" signal over 0 dBm is being measured or a "low range" signal below 0 dBm is being measured is supplied through an inverter 225 to one input of an AND gate 227 as well as being applied directly to one input of an AND gate 229. When the signal in the line 221 indicates that the signal level range utilized is above 0 dBm, the low range circuit 199 (because of the input of the line 221 to its AND gate 229) does not control the time that the NAND gate 175 is opened to pass the clock pulses from the line 173. Rather, the high range circuit 197 controls the number of pulses permitted to pass to the output line 159 of the NAND gate 175.

Assuming for the purposes of an example that the range signal in the line 221 indicates a low range signal below 0 dBm is being measured while the circuit is in a signal level state, the signal $T_c$ of FIG. 7g referred to earlier passes through an exclusive OR gate 235 and through the AND gate 229 to the NAND gate 175 at one of its input lines 203. Under these conditions, pulses appear at the output of the NAND gate 175 during a time period indicated by the signal $T_g$ of FIG. 7h. The pulses appear in the line 159 from the clock 173 from the beginning of the sequence at $t_0$ (by virtue of a clock signal $T_0$ applied to one input of the NAND gate 175) until there is a comparison of voltage levels at the input of the comparator 187.

When operating in a signal level state in the high range above 0 dBm, the low range circuit 199 becomes ineffective by virtue of its signal to one input of the AND gate 229 to count out the number of pulses permitted to pass through the NAND gate 175. Therefore, when measuring the top range of signal level or any range of noise level, the high range circuits 197 control the length of time that pulses are emitted from the NAND gate 175. An example of this is shown in FIGS. 7i and 7j wherein the high range circuits 197 receive as inputs to an exclusive OR gate 231 the $T_{10}$ timing signal and the comparison $T_c$ signal from the comparator 187. An output of the exclusive OR gate 231 is applied through an inverter 233 to a second input of the AND gate 227. The output in the line 201 enables pulses to pass through the NAND gate 175 when the comparison signal $t_c$ (FIG. 7i) is high and the timing signal $T_{10}$ (FIG. 7c) is low.

The reason for this particular gate interval as illustrated in the waveform of FIG. 7j is that the time difference between $t_0$ and $t_{10}$ is calculated to be that time required to pass enough pulses from the clock source 173 which drive the data convertor 161 and thus the display circuit 177 through a selected dB window range which is preferably 10 dB in width. The characteristics of the curve of FIG. 7a are also operatively chosen by adjustment of the values of the capacitor 191 and the resistance 193 to cause this to work out. In the top range of the signal level measurement, the range is from 10 dBm down to 0 dBm in the time period from $t_0$ to $t_{10}$, respectively. Thus, the gate interval signal of FIG. 7j starts upon a comparison being obtained at the output of the comparator 187 and stops at a time $t_{10}$ the difference being proportional to the positive signal level in dBm. Conversely, the negative going example described with respect to FIGS. 7g and 7h increases the digital display output with decreasing signal so the pulse train at the output of the NAND gate 175 is begun at the same time that the capacitor 191 begins to discharge, at time $t_0$. The pulse train for the negative going example is thus stopped when comparison of the analog signal levels to the input of the comparator 187 occurs.

It is thus seen that no analog change is required in the nature of the signal as illustrated in FIG. 7a for switching between ranges above 0 and below 0 dBm. Rather, the switching is accomplished digitally by varying the intervals during which pulses are permitted to pass through the NAND gate 175. This has the result of being more accurate since analog manipulations are undesirably subject to error in their magnitudes.

In a specific embodiment of the present telephone testing apparatus, the signal level ranges provided are from a maximum of +10 dBm down to −52 dBm. The range selecting circuits 139 (FIG. 5) switches over this range in six steps. In order to prevent indecision as to which range a particular signal being measured should be placed, the ranges are made to overlap. Therefore, instead of only a 10 dB range for the size of the window into which all incoming signals are placed by the auto-ranging circuit 139, the range is made to be 12ddB, thereby providing a 2 dB overlap or "hysteresis." As a result, the top signal level measuring range goes from a high of +10 dBm to a low of −2 dBm. The next lower range extends from 0 dBm to −12 dBm, and so forth. The techniques described with respect to FIGS. 6 and 7 are also useful in the case of this top range which itself crosses zero dBm in a logarithmic analog-to-digital convertor circuit. The circuits and techniques described above with respect to FIG. 6 allows such hysteresis to be simply implemented, wherein one of the measuring ranges must necessarily cross zero.

FIGS. 7k and 7l illustrate an example of the comparator output signal in the line 195 and the gate interval during which pulses are allowed to pass to the line 159, respectively, for a case where the signal level being measured is within the overlap range of 0 dBm to −2 dBm. If no comparison is made between the signal level $v_{IN}$ and the fixed reference $V_0$ within the interval of $t_0$ to $t_{10}$, the rise of the timing signal $T_{10}$ (FIG. 7c) enables the gate 175 to begin passing the clock pulses from the input line 173. The gate 175 is then turned off upon a comparison of these voltage levels occuring.

If no comparison occurs in the interval of $t_0$ through $t_{12}$, the impedance and gain networks of the auto-ranging circuits 139 (FIG. 5) are changed by a signal in the line 141 to change the signal level or noise range. The range is controlled by a range counter 251 (FIG. 6) having a BCD output in line 253. This output is changed by one count in response to a range counter advance pulse in a line 255 which occurs in a manner as shown in FIG. 7m. Such a pulse advances the range counter 251 one count in a direction determined by the control signal level in the line 113 which controls whether the circuit is measuring signal level or noise level. When the circuit is measuring signal level, the range counter 251 increases one count for each pulse in the line 255 as the range is lowered for a lower level signal level to be measured. Conversely, when the circuit of FIG. 6 is set to measure noise level, the counter 251 increases as the noise level range increases. The state of the range counter 251 is the controlling element of the gain and/or attenuation of the auto-ranging circuits 139 (FIG. 5) because of its connection therewith through the decoding circuit 223 and the circuit 141. The advance pulse in the line 255 is fabricated in a logic enabling circuit 257 which has as its inputs the timing signals $T_0$ and $T_{12}$ as well as the comparator output 195. The pulse in the line 255 is generated by the circuits 257 when comparison does not occur in the time period $t_0$ through $t_{12}$.

The manner in which the pulse train output in the line 159 of the NAND gate 175 of FIG. 6 is counted, will now be described. A counter 261 is advanced one count by each of the pulses in the line 159. Its count is presented in BCD binary form at an output 263. A second counter 265 having a BCD output in lines 267 is advanced every 10 counts of the counter 261 by an overflow signal applied to the counter 265 through an OR gate 269. A third BCD connected counter 271 having binary count output lines 273 is advnaced every 10 counts of the counter 265 (as a result, every 100 counts of the counter 261) by an overflow signal applied through an OR gate 275. Each of the three counters 261, 265 and 271 is reset at time $t_R$ by being connected to the timing signal line 207 which emits a timing signal $T_0$ of FIG. 7b.

A latching circuit 277 receives the output of the counter 261 and presents an inverted output in lines 279 upon receipt of a storage pulse in the line 215 from the timing circuits 205. There is no display digit connected to the output of the latching circuit 277. A second latching circuit 281 receives the output in a line 267 of the counter 265 and transfers this output to lines 283 in response to the storage pulse in this line 215. Also, an inverted output occurs in a second set of output lines 285. A third latching circuit 287 transfers the binary signal in the output lines 273 of the counter 271 to its output lines 289 upon the occurance of a store pulse in the line 215. The time sequence of the store pulse in the line 215 is indicated in FIG. 7f.

The output 283 of the latching circuit 281 is applied to drive the least significant displayed digit 183 of the display device 177. The display 177 operates in response to the controlling signal levels in the line 113 to permit display of the output of the latch 281 when the circuit is in its signal level mode but to inhibit or blank display of this digit when in the noise mode. As discussed previously, noise measurements are not desired to any more accuracy then one decibel. The digit 181 of the display device 177 shows the count in the output lines 289 of the latch 287. Every 10 counts of the counter 271 initiates a change of state in a flip-flop circuit 293, this change of state being communicated to a range addition circuit 295. The range addition circuit 295 receives as its input the output lines 253 of the range counter 251. Output circuits 297 of the range addition circuit 295 drive the most significant digit 179 of the display 177. The output of the range addition circuit 295 is its input in the lines 253 plus one if the flip-flop 293 has been changed in state as a result of an overflow in the counter 271. The flip-flop 293 will change its state only if the circuit is operating in its hysteresis or overlap region between ranges, as described above.

The basic system for giving signal level or noise level readings has thus been described with respect to FIG. 6. Two other features embodying other aspects of the present invention are also shown in FIG. 6. Both of these other features involve the use of a counter 261 and a latching circuit 277 as an initial counting stage for the least significant electronically derived digit which is not displayed. It will be noted that the counter 261 and the latch circuit 277 are not necessary for the number of digits displayed but rather have the function of improving accuracy by providing for calibration indication and rounding off. A normal one count maximum error in existing displays is reduced to a one-half count by the rounding off technique of the present invention.

For the calibration feature, a calibration light 301, which may most conveniently be a light emitting diode, is connected to the inverted outputs of the latches 277 and 281 through appropriate logic elements, in this case one diode in each of the four output lines of each of the latching circuits 277 and 281. These logic elements are connected so that the light 301 gives a visual indication only when the binary state of the counter outputs 263 and 267 show that both represent a numerical zero. This permits a technician to adjust the gain 150 (FIG. 5) to obtain a decimal calibration of one more place than displayed when a reference signal 165 (FIG. 5) is applied to the input of the level/noise circuits.

The second additional feature is a rounding off capability wherein two round off circuits 303 and 305 receive in their respective input lines 307 and 309 the states of the counters 261 and 265. These round off circuits are identical and include logic decoding elements for determining when the state of the counters 261 and 265, respectively, are in one of the numerical states 5 through 9. When one of the round off circuits 303 or 305 senses the state of its associated counter upon the occurrence of a round off pulse in a line 213 (timing shown in FIG. 7e), the circuits pass on this round off pulse to its output lines 311 and 313. Only one of the round off circuits 303 and 305 are enabled at any one time, however, depending upon the state of the control signal in the line 113. When a signal level measurement is being made, the round off circuit 305 is disabled by inverting the signal in an inverting amplifier 315 while the round off circuit 303 is enabled. That is, when in the signal level mode, a pulse appears in the output line 311 when the counter 261 is in any of its states 5 through 9 at the occurrence of a round off pulse in the line 213. This output pulse in the line 311 advances the counter 265 through the OR gate 269 by one count and thus rounds off the least significant displayed digit. The same operation occurs when the signal in the line 113 directs that noise level measurements are taking place, except the round off circuit 305 is then operative while the round off circuit 303 is inoperative. It should be remembered that the digit 183 is not displayed during a noise level measurement by operation of the blanking circuit 291 and so even during noise measurement, the least significant displayed digit, in this case the digit 181, is rounded off by developing a signal as to a lesser significant undisplayed digit.

In addition to the better accuracy generally that is afforded with the round off circuits, there is a particular improvement in accuracy for readings around 0 dB. Without the rounding off feature, there is an excessive range between +1 and −1 of the least significant displayed digit that will read zero. The proper range for displaying the zero digit is the one unit interval from +0.5 to −0.5. With the round off circuits of this invention, this range is correctly set to +0.5 to −0.5 of the least significant digit.

Figure 8:
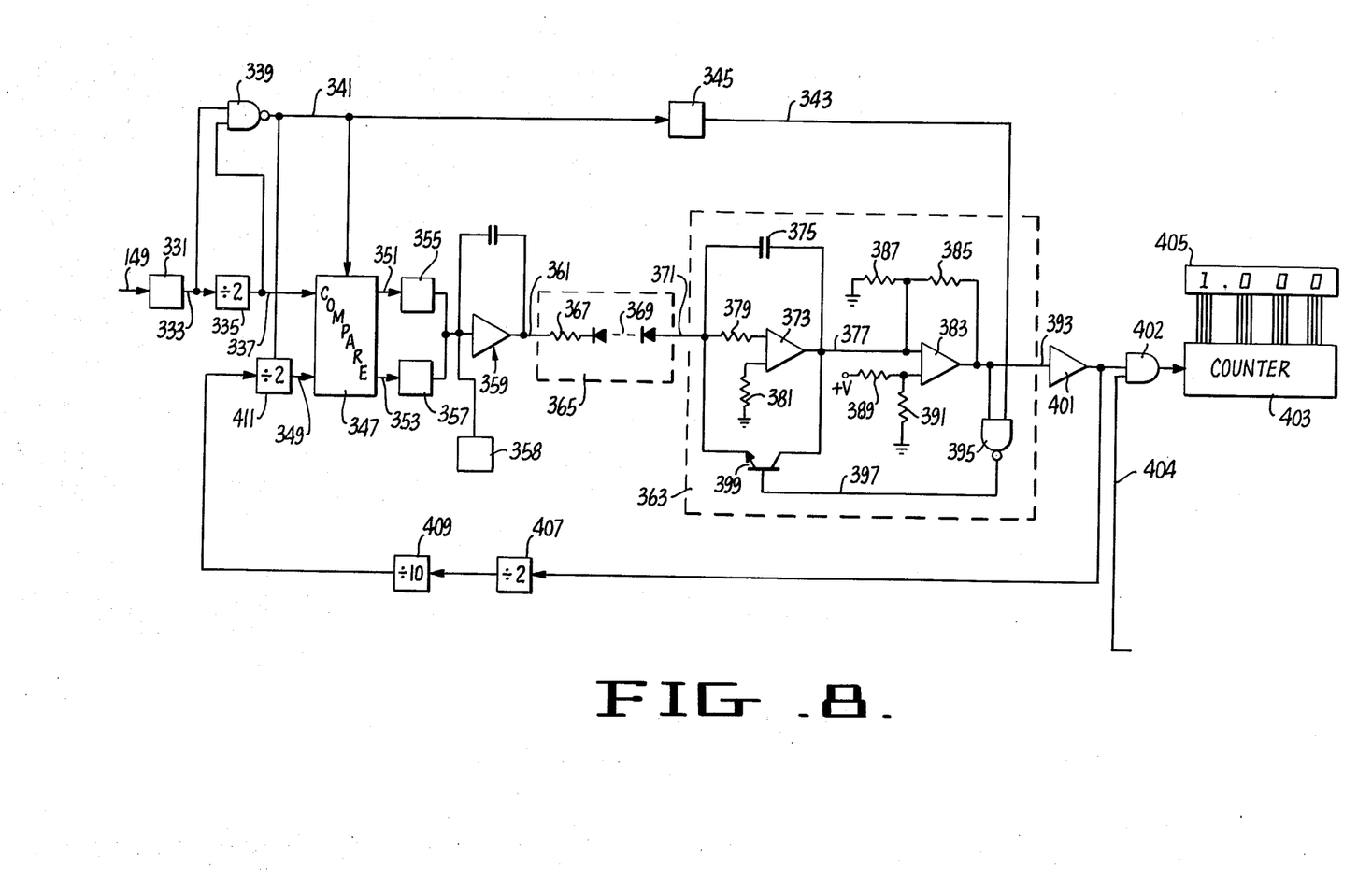
FIG. 8 is a diagram of an improved circuit for making frequency measurements according to the present invention.
Figure 9:
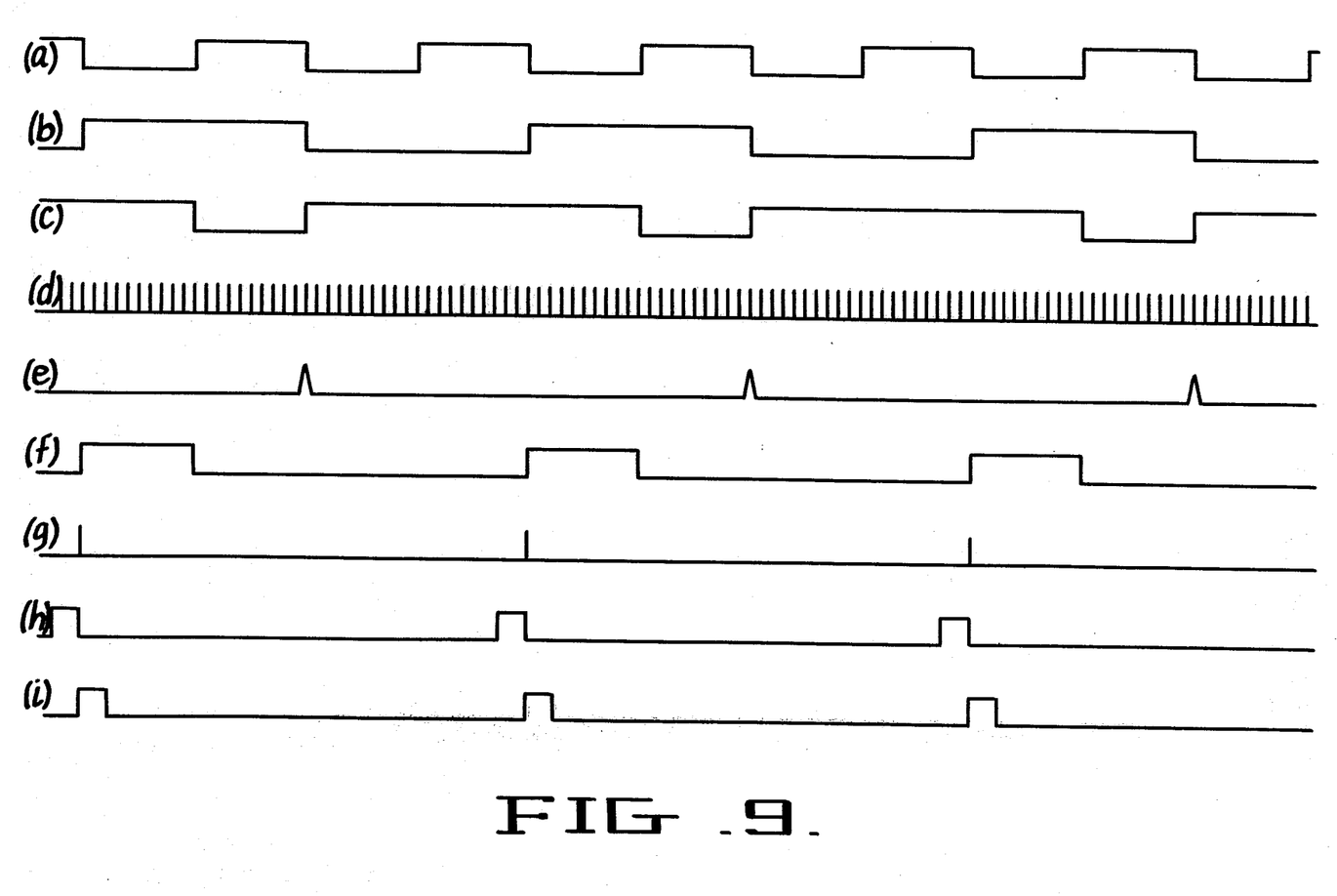
FIG. 9 is a timing diagram of the circuit of FIG. 8.

Referring primarily to FIG. 8, a block diagram of the frequency measuring module is presented. As discussed before, an input line 149 carrying a signal into the circuit of FIG. 8 to be measured is obtained from the level/noise L3 module (FIG. 5). The signal has had its gain adjusted by the time it reaches the frequency module F1 circuit illustrated in FIG. 8. This signal, normally a sinusoid, is initially applied to a Schmidt trigger type of circuit 331 to generate a squarewave signal at its output line 333 having the same period as the input sinusoid in the line 149. The squarewave signal in the line 333 of FIG. 8 is illustrated in the timing diagram, FIG. 9a. This signal is inputted to a divide-by-two circuit 335, most conveniently a J-K flip-flop circuit whose output in a line 337 is illustrated in FIG. 9b and has one-half the frequency as the squarewave signal in the line 333 as illustrated in FIG. 9a. The divide-by-two circuit 335 is used so that the subsequent signal operated upon is symmetrical; that is, each one-half cycle has the same time duration. Compensation is thus provided for an input signal in line 333 whose time duration of each one-half cycle is not necessarily equal.

A NAND gate 339 has two inputs connected to receive both the squarewave signals from the lines 333 and 337. An output 341 of the NAND gate 339, as illustrated in FIG. 9c, is normally at a high level but goes to a low level during the timee that both of the signals in the line 333 and 337, FIGS. 9a and 9b, respectively, are high. This signal in the line 341 functions as a synchronizing and timing signal, as described hereinafter. One use of this signal is the generation of the synchronizing spikes illustrated in FIG. 9e in an output line 343 of a one-shot 345.

A comparison circuit, indicated by the block 347 of FIG. 8, compares the time of occurence (Phase) between the input signal 337 and a feedback signal in a line 349. This feedback signal, to be described hereinafter, is illustrated in FIG. 9f in one form. The circuits 347 compare the rising edges of the signals of FIGS. 9b (in line 337) and 9f (in line 349). When these leading edges occur at the same time, infinitesimally small duration pulses as illustrated in FIG. 9g occur in the comparator output lines 351 and 353. When one of these leading pulse edges occurs before the other, an output in the form of FIG. 9h occurs in a line 351. Conversely, if the other leading edge of these two input signals to be compared leads the one pulse leading edge, a pulse as illustrated in FIG. 9i occurs in the line 353. The duration of the pulses occurring in one of the lines 351 and 353 is equal to the difference in time of occurrence of the rising edge of the pulses of FIG. 9b and 9f, up to certain limits established by the circuitry of the comparator 347. The comparison circuit 347 is preferably a logic network wherein the error signals illustrated in FIGS. 9h and 9i occur at the output of an exclusive OR gate having as its two inputs the lines 337 and 349. Additional logic circuits determine the relative time of occurrence of the leading edges of the pulses of FIGS. 9b and 9f so that the output of this exclusive OR gate is directed to either one of the lines 351 or 353 depending upon this relative time of occurrence.

The error signals in the lines 351 and 353 are applied to current switches 355 and 357, respectively. The outputs of these current switches are connected together to an input of an integrator circuit 359. An output in a line 361 is a direct current voltage which is proportional to the frequency which is desired from a current controlled oscillator 363. The polarity of the currents generated by the current switches 355 and 357 are opposite so that the voltage at the output 361 of the integrator goes up in response to a pulse in the line 351 (FIG. 9h) and goes down in response to a pulse in the line 353 (FIG. 9i).

Rather than applying the output of the integrator 361 directly to the current controlled oscillator input 363, it is applied thereto through a loop gain modifier 365 which includes a series circuit of a resistor 367 and a plurality of diodes 369. The current controlled oscillator 363 is of a type that its input 371 is maintained at substantially zero volts. The output 361 of the integrator 359, in a specific example, is driven from zero volts in a negative direction. Therefore, the diodes 361 are forward biased. At very low voltages in a line 361 corresponding to a low desired output frequency of the current controlled oscillator 363, the diodes operate on a non-linear portion of the characteristic curve. In a specific form of the circuit, eight such diodes are connected in a series. The result is that a large change in the output voltage 361 of the integrator 359 at these low desired oscillator frequencies is required to bring about small changes in the frequency output of the oscillator 363. A reduction in the loop gain for low frequency is thus accomplished. That is, the inherent higher gain at low frequency of such a phase lock loop circuit has been compensated by non-linear characteristics of the circuit 365. This reduction of loop gain variation permits maintaining the overall loop again at a higher level, thus yielding faster acquisition of frequency lock and faster readout of frequency.

The current control oscillator 363 includes a first differential amplifier 373 with a feedback capacitor 375 to result in an increasing voltage at its output 377 over time. One input of the amplifier 373 is connected to the input 371 of the oscillator through a series connected resistor 379 and the other input of the amplifier 373 is connected to ground potential through a resistor 381. The slope of the rising voltage at the output 377 is determined by the current at the input of the oscillator through the resistor 367 and diodes 369. This current goes up with increasingly negative voltage output of the integrator 359 in its line 361.

A second differential amplifier 383 within the current controlled oscillator 363 is connected as a comparator with an upper threshold limit and a lower threshold limit. These thresholds are set by the voltage dividers made up primarily of a feedback resistor 385 and a grounded resistor 387 connected to one input of the amplifier 383. Another voltage divider including resistors 389 and 391 are connected in series from a positive voltage supply to ground with the second input of the amplifier 283 connected therebetween. The result is that the output of the voltage controlled oscillator 363 in a line 393 is a plurality of pulses as illustrated in FIG. 9d. The comparator 383 keeps the height of each of the pulses the same as a result of its upper threshold limit. The upward slope of the ramp portion of a saw-tooth waveform in the line 377 is dependent upon the input current in the line 371 of the current controlled oscillator 363. As a result, the frequency of output pulses in a line 393 is dependent upon this input current in a line 371.

A NAND gate 395 within the current controlled oscillator 363 has one input from the oscillator output at the line 393 and another input from the synchronizing signal in the line 343. The output of the NAND gate 395 in a line 397 is applied to the base of a transistor 399, the emitter and collector of this transistor are connected between the input line 371 and the output line 377 of the integrating amplifier 373. As a result, when the rising level of the ramp portion of the spike output in the line 393 exceeds a certain threshold voltage level of the transistor 399, it is caused to switch from its non-conductive to its conductive state. When in its conductive state, the transistor 399 causes an instantaneous discharge of the capacitor 375 and its voltage drops to zero to form the downside of a voltage spike. This discharging pulse can also be received from the line 343 and, as a result, the phase of the oscillator output is synchronized with the phase of the input signal in the line 149. This improves the speed with which the circuit of FIG. 8 "locks" onto the frequency of the input in a line 149 and also increases the frequency range over which such a circuit is operable.

The spike output of the oscillator 363 is applied through an amplifier 401 to a BCD counter and latching stage 403 through an AND gate. The counter block 403 includes, typically, a digital counter and an associated latching circuit for each displayed number of a remote digital display 405. A second input 404 to the AND gate 402 carries a gating signal that passes pulses to the counter 403 for 1/20 second. The output of the oscillator 401 is also applied in series to a divide-by-two circuit 407, a divide-by-ten circuit 409 and another divide-by-two circuit 411 to develop the feedback signal in a line 349 which is compared with the input. As a result, when the circuit of FIG. 8 is locked on the input frequency, the spike frequency at the output 393 of the current controlled oscillator 363 is 20 times the input frequency in the line 149. The frequency of input signal in the line 149 can thus be determined in a much shorter time and displayed on the remote display device 405 than if the oscillator 363 were operating at a lower factor times the input frequency of the signal to be measured.

The timing signal of FIG. 9c which appears in the line 341 of FIG. 8 is also applied to the comparator circuit 347 and to the divide-by-two circuit 411. The logic of the comparator circuit 347 uses this signal to turn off (inhibit) any output voltage in the lines 351 and 353 for one-fourth of the time while the signal of FIG. 9c is in its negative going pulse. This disabling is done so that the oscillator 363 can be time sequenced by the spike synchronizing pulses in the line 343 without any change in input in its line 371. The pulse in the line 341 is applied to the divide-by-two circuit 411 in order to reset that circuit. The divide-by-two circuit 411 is preferably a J-K flip-flop circuit which emits a pulse in its line 349 in response to two input pulses from the divide-by-ten circuit 409. However, only one pulse is permitted to appear at the output of the divide-by-two circuit 411 after each negative going synchronizing pulse in the line 341 (FIG. 9c). This prevents a plurality of feedback pulses for each input signal cycle in the line 337 with a result of maintaining loop gain when out of lock, thus speeding up locking of the circuit of FIG. 8 onto the input frequency and facilitating a wider frequency capture range.

It is desirable that the frequency output 393 of the oscillator 363 be near zero in the absence of an input signal. For telephone line testing, the frequencies are in the voice band so the oscillator 363 will respond more quickly if it is initially near zero rather than at a high frequency. This is accomplished by inserting a current bias 358 into the input of the integrating amplifier 359 that tends to drive its output 361 toward zero d.c. volts.

The various aspects of the present invention have been described with respect to a preferred embodiment thereof but it will be understood that the invention is entitled to protection within the full scope of the dependent claims. For instance, the techniques of the present invention may be employed on other than communication circuits, such as in the production testing of circuits and components used in other test equipment.

We claim:

1. An electronic circuit for selectively measuring either signal level or noise level from a communication circuit, comprising:
    a single visual display device,
    an input for connection to said communication circuit under test,
    control means responsive to a control input for establishing either signal level or noise level states,
    an amplifier responsive to the input, said amplifier being switchable between two distinct amplification levels and connected to said control means to have a different amplification when said control means is in its noise state than when said control means is in its signal level state,
    a filter circuit for modifying the frequency response of the amplified signal, said filter circuit being switchable between at least two different frequency response curves in response to the state of said control means, said filter circuit having a different bandwidth when said control means is in its noise state than when said control means is in its signal level state,
    means receiving the output of said filter circuit for detecting said output in a manner to form a DC signal output, said detector being responsive to said control means in a manner to be a first type detector when said control means is in its signal level state and to be a second type detector when said control means is in its noise state, and
    means receiving the DC output of said detector for driving said single visual display.

2. The circuit of claim 1 wherein said driving means includes means for shifting the signal prior to its application to the visual display that a zero reading occurs on the visual display in response to one input level at said input when said control means is in its signal level state and a zero reading occurs in response to a second distinct input level at the input when said control means is in its noise level state.

3. The circuit of claim 2 wherein said one and said second input levels of said driving means are zero dBm. and minus ninty dBm., respectively.

4. The electronic circuit of claim 1 wherein said first type of detector is an average type and said second type of detector is a r.m.s. type.

5. The electronic circuit of claim 1 wherein said single visual display is a multi-digital display device and wherein said display driving means includes means for blanking display of the least significant digit when said control means is in its noise state while permitting display of the least significant digit when said control means is in its signal level state.

6. The electronic circuit according to claim 1 wherein said display driving means additionally includes means responsive to the state of said control means for updating the single visual display less often when said control means is in its noise state than when said control means is in its signal level state.

7. The electronic circuit according to claim 1 wherein said control input to said control means is manually established by an operator.

8. The electronic circuit according to claim 1 wherein said control input to said control means includes automatic means sensing the level inputted to said circuit for developing a control input to said control means to switch into its signal level state if the circuit input is in excess of a predetermined amount and to switch said control means into its noise level state if said input is less than a predetermined amount.

* * * * *

UNITED STATES PATENT AND TRADEMARK OFFICE
CERTIFICATE OF CORRECTION

PATENT NO. : 3,965,418
DATED : June 22, 1976
INVENTOR(S) : Paul R. Bauer and Duane E. Dunwoodie It is certified that error appears in the above–identified patent and that said Letters Patent are hereby corrected as shown below:

Column 1, line 7, "U.S. Patent No. 3,980,495" should be --U.S. Patent No. 3,890,495--.

Column 3, line 34, "of" should be --or--.

Column 4, line 11, "persent" should be --present--.

Column 6, lines 13 and 14, "S2'', S3'', S4'' and S5''" should be --S2', S3', S4' and S5'--.

Column 9, line 33, "cmpo" should be --compo--.

Column 10, line 1, "remmote" should be --remote--.

Column 10, line 50, "thre" should be --there--.

Column 11, line 46, "window" should be --"window"--.

Column 12, line 30, the words --is displayed to-- should be inserted after the word "measurement".

Column 15, line 8, "window" should be --"window"--;
line 44, "window" should be --"window"--.

Column 16, line 38, "advnanced" should be --advanced--.

Column 19, line 50, "again" should be --gain--.

Signed and Sealed this

First Day of February 1977

[SEAL]

Attest:

RUTH C. MASON
*Attesting Officer*

C. MARSHALL DANN
*Commissioner of Patents and Trademarks*